United States Patent [19]

Brophy et al.

[11] Patent Number: 4,973,121
[45] Date of Patent: Nov. 27, 1990

[54] SCANNER

[75] Inventors: Chris P. Brophy, Tucson, Ariz.; Sanwal P. Sarraf, Webster, N.Y.

[73] Assignee: Eastman Kodak Company, Rochester, N.Y.

[21] Appl. No.: 391,270

[22] Filed: Aug. 9, 1989

[51] Int. Cl.$^5$ ............................ G02B 6/10; G02B 1/29
[52] U.S. Cl. .................................................. 350/96.14
[58] Field of Search ............... 350/96.12, 96.13, 96.14, 350/355; 372/24

[56] References Cited

U.S. PATENT DOCUMENTS

| | | | |
|---|---|---|---|
| 3,924,931 | 12/1975 | Chee | 350/160 R |
| 3,958,862 | 5/1976 | Scibor-Rylski | 350/160 R |
| 4,389,659 | 6/1983 | Sprague | 346/153.1 |
| 4,755,036 | 7/1988 | Suzuki et al. | 350/96.13 |
| 4,758,062 | 7/1988 | Sunagawa et al. | 350/96.14 |
| 4,770,483 | 9/1988 | Ridgway | 350/96.13 |

Primary Examiner—John D. Lee
Assistant Examiner—John Ngo
Attorney, Agent, or Firm—Donald D. Schaper

[57] ABSTRACT

A scanner is disclosed which uses an electro-optic deflector to deflect a light beam onto a receiving medium. The deflector comprises a substrate formed of an optical material and a thin film optical waveguide fabricated on a top surface thereof. An array of parallel metallic electrodes are formed on the waveguide. Each of the electrodes is adapted to receive a voltage independently of the other electrodes. When a voltage is supplied to an electrode, a spatial variation in the index of refraction occurs across the thickness of the waveguide, and this spatial variation is used to deflect a light beam. In order to use the waveguide to scan a light beam across the receiving medium, the light beam is supplied to the waveguide in a direction transverse to the electrodes, and a voltage is sequentially supplied to the electrodes.

9 Claims, 2 Drawing Sheets

SCANNER

CROSS REFERENCE TO RELATED APPLICATION

Reference is made to U.S. patent application Ser. No. 390,956, entitled Scanner, filed in the name of Sarraf on even date herewith; this application is assigned to the assignee of the present application.

BACKGROUND OF THE INVENTION

1. Field of the Invention

This application relates to a scanner, and more particularly, to solid state waveguide scanner.

2. State of the Prior Art

Various printing systems are known in which a modulated light beam is scanned across a receiving medium. Mechanical deflection devices, such as polygon scanners or galvanometers, can be used to direct the light beam onto the receiving medium. Although these devices are generally satisfactory for many applications, there is a need in the art to increase the speed of operation of the devices and to achieve greater pixel density. In response to these needs, solid state deflection devices have been developed. Such devices include devices using LED's to expose a recording medium and devices using electro-optic elements which have a plurality of individually addressable electrodes for controlling the passage of light.

In the patent to Sprague, U.S. Pat. No. 4,389,659, there is shown a scan printer which includes a multi-gate light valve comprising an electro optic element, and a plurality of separately addressable electrodes coupled to the electro-optic element. A sheet like collimated beam is transmitted through the electro optic element, and an information signal is selectively applied to the electrodes to control the light which is transmitted to a receiving medium. A problem with this printer is that the output power of the light source is effectively divided among the many picture elements required to define a line of the image. If the data samples are short lived, there may be insufficient energy available at one or more picture element positions to adequately expose the receiving medium. Thus, complex circuitry is necessary to maintain the data samples for each line of the image on the electrodes for a period of time sufficient to expose the recording medium.

SUMMARY OF THE INVENTION

It is an object of the present invention to overcome the problems in the prior art discussed above and to provide a scanner having improved performance.

In accordance with one aspect of the present invention, there is provided a scanner comprising: a substrate formed of an optical material; a thin film optical waveguide on the surface of the substrate; a plurality of generally parallel electrodes formed on the waveguide, the electrodes extending in a first direction and being generally parallel to each other; means for applying a voltage to the electrodes to produce a spatial variation in the index of refraction of the waveguide across the thickness thereof; means for coupling a coherent light beam into the waveguide in a second direction transverse to the first direction, the beam propagating in the second direction and being deflected in the plane of the film upon encountering a spatial variation in the index of refraction., and means for coupling the deflected beam out of the waveguide.

In one embodiment of the invention, the scanner includes an electro optic waveguide which comprises an electrically conductive substrate having a thin film optical waveguide fabricated on a top surface thereof. An array of thin metallic electrodes are formed on the waveguide. The electrodes are equally spa:ed and are parallel to each other. Each of the electrodes is adapted to receive a voltage independently of the other electrodes. When a voltage is applied to a selected electrode, a potential difference is produced between the electrode and the substrate. This potential difference generates an intense electric field, oriented perpendicular to the plane of the waveguide, which produces a spatial variation in the index of refraction of the waveguide across the thickness of the waveguide.

A laser beam is coupled into the waveguide such that the beam propagates in a direction transverse to the electrodes. When a voltage is applied to a selected electrode, the beam is deflected into the plane of the waveguide. The deflected beam is coupled away from the waveguide by means of a Bragg matched grating, and the beam is imaged onto a receiving medium by optical elements.

An advantage of the scanner of the present invention over mechanical deflection systems is that the scanner is much more reliable and compact than such systems. The disclosed scanner has the advantage over solid state devices, such as LED arrays, of having a much simpler microelectric structure. Further, the scanner of the present invention solves the problem of insufficient light output which exists in known waveguide scanners of the total internal reflection type. The disclosed scanner can be used both as an input scanner and an output scanner.

Other features and advantages will become apparent with reference to the following Description of the Preferred Embodiment when read in light of the attached drawings.

DESCRIPTION OF A PREFERRED EMBODIMENT

Figure 1:
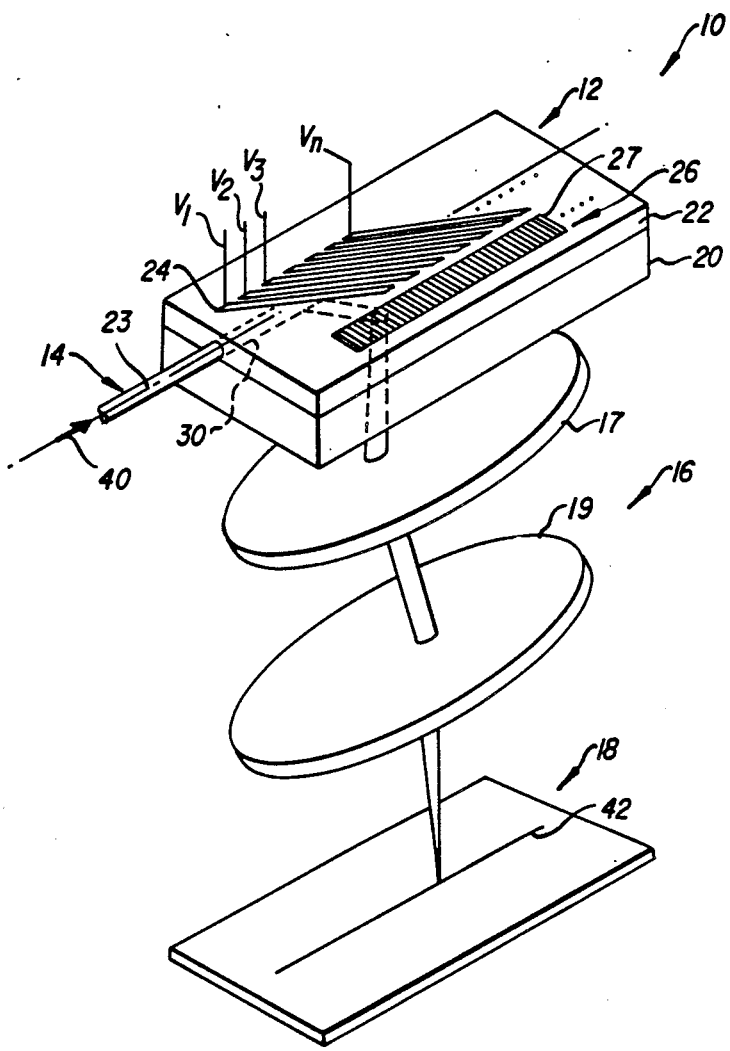
FIG. 1 is a perspective view of the scanner of the present invention.

With reference to FIG. 1, there is shown an input scanner 10 constructed in accordance with the present invention. Scanner 10 comprises an electro-optic deflector 12, an input light source 14, imaging optics 16, and a receiving medium 18 which can be, for example, a photosensitive medium.

Deflector 12 comprises a substrate 20 which can be formed from an optical material such as glass, sapphire, or quartz. Substrate 20 can also be an electrically conductive substrate, for example, a highly doped GaAs substrate. A thin film optical waveguide 22 is formed on substrate 20. Waveguide 22 can be, for example, a semiconductor thin film grown on the substrate 20 by liquid phase or vapor phase epitaxy. Waveguide 22 can also be an electro-optic thin film material such as LiNbO₃, BaTiO₃, or an organic material of a high electro optic coefficient.

Figure 2:
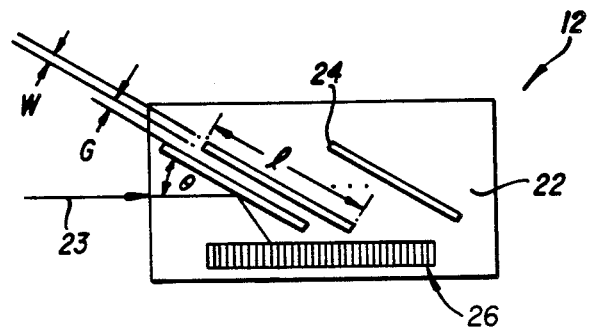
FIG. 2 is a top plan view of the deflector in the scanner shown in FIG. 1.

A plurality of metallic electrodes 24 are formed on waveguide 22. As shown in FIGS. 1 and 2, the electrodes 24 are parallel to each other and are spaced from each other by an equal amount G (FIG. 2). The electrodes 24 are disposed at an angle $\theta$ to an optical axis 23 of a beam from light source 14. For waveguides of the type disclosed herein, the size of angle $\theta$ must not exceed a maximum value in order for total internal reflection to occur in the waveguide material. For a waveguide 22 made of BaTiO₃, for example, the maximum value for $\theta$ is about 9°.

Figure 3:
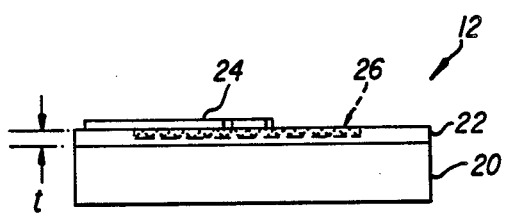
FIG. 3 is a front elevational view of the deflector shown in FIG. 2.

Each of the electrodes 24 is connected to a voltage supply, indicated by $V_1$-$V_n$, and the electrodes 24 can be selectively actuated to produce a potential difference between the electrode and the substrate 20. When a voltage is applied to an electrode, an intense electrical field is generated in a direction perpendicular to the plane of the waveguide. This electrical field produces a spatial variation in the index of refraction of the waveguide material across the thickness, designated t in FIG. 3, of the waveguide 22. Voltages can be supplied to electrodes 24 in a known manner. For example, a multiplexer (not shown) can be used to sequentially apply a voltage to successive electrodes 24.

Electrodes 24 can also be connected to a voltage supply (not shown) su:h that a voltage is successively aPPlied across adjacent pairs of electrodes 24. In this arrangement, a fringing field is formed between two adjacent electrodes which produces a spatial variation in the index of refraction of the material of waveguide 22. It has been found that the arrangement in which a voltage is applied across adjacent electrodes is more desirable for waveguides of LiNbO₃ and BaTiO₃, and that the arrangement, described above, in which the electrodes are connected to produce a potential between an electrode 24 and the substrate 20, is more desirable for waveguides formed of an organic material.

Light source 14 is coupled into the waveguide 22. A Preferred laser for use in the present invention is a semiconductor laser. Because of the small thickness of the single mode waveguide 22, direct end fire coupling of external laser energy into the waveguide 22 is not very efficient. Reliable coupling of an input beam into the waveguide 22 can be maximized by fabricating the light source, such as a diode laser (not shown). directly on the waveguide If the source is not fabricated on the waveguide, it may be desirable to couple the light source to the waveguide 22 by means of a prism or a grating in order to achieve greater efficiency.

The coupling of a beam 30 away from the line of the electrodes 24 can be achieved by an appropriately oriented Bragg matched grating 26. The light beam 30 propagates along optical axis 23 until it encounters a spatial variation in the index of refraction in waveguide 22 produced by a voltage on an electrode 24. The spatial variation in the index of refraction serves to deflect the beam 30 in the plane of waveguide 22 toward grating 26, as shown in FIG. 1. Grating 26 is oriented for optimal in plane diffraction, and the grating lines 27 in grating 26 are oriented to yield a single output beam which is perpendicular to the electrodes 24. Imaging optics 16 can be, for example, of an afocal type which includes a pair of positive lens 17 and 19.

An important feature of the present invention is the high pixel density which can be obtained in scanner 10.

The pixel spacing produced in scanner 10 is dependent on a number of factors, including the electro optic strength of the material of waveguide 22 and the breakdown field in air above electrodes 24 ($\approx 3V/\mu m$). The electrodes 24 must be of a high aspect ratio so that their projection is large enough to intercept the guided beam width. The term aspect ratio, as used herein, refers to the ratio of the width W (FIG. 2) of the electrode 24 to the length l of the electrode. The minimum pixel spacing, $P_m$, in $\mu m$, in scanner 10 can be calculated, as follows:

$$P_m = n^2 Y_a \theta^3 (1+w_g)/[9K^2 \mu m/V] \quad (1)$$

where n is the refractive index of the waveguide material, $Y_a$ has a value in $\mu m$ on the order of the waveguide thickness, $\theta$ is the electrode orientation angle, $w_g$ is the ratio of electrode width W to electrode gap G, and K is the electro-optic strength of the waveguide material in $\mu m/V$.

A preferred material for waveguide 22 is BaTiO₃ which possesses an electro optic tensor coefficient of $r_{15}$; this is 27 times as large as the coefficient for LiNbO₃ which is $r_{33}$. The very large electro optic tensor coefficient of BaTiO₃ leads to an electro-optic strength which is potentially 33 times that for LiNbO₃. In one representative example of the present invention, deflector 12 includes a waveguide 22 which is formed by a thin film of BaTiO₃ of about 0.15 $\mu m$, an electrode aspect ratio of 250:1, an electrode width W and gap G both of 2 $\mu m$, and an angle $\theta$ of 5.12°. In this example, using Equation (1), a $P_m$ equal to 26 $\mu m$ is obtained which yields a density of 1000 spots for a device having a length of seventeen centimeters.

In the operation of scanner 10 to impart information to receiving medium 18, a modulated beam from light source 14 enters waveguide 22 in the direction of arrow 40. Electrodes 24 are actuated in sequence by means of voltages $V_1$-$V_n$ to create a spatial variation in the index of refraction of waveguide 22 at successive locations therein to scan the beam along a scan line 42 on receiving medium 18. In order to complete an image on medium 18, a means (not shown) is provided to move the receiving medium in a direction perpendicular to s:an line 42 in timed relation to actuation of electrodes 24.

Figure 4:
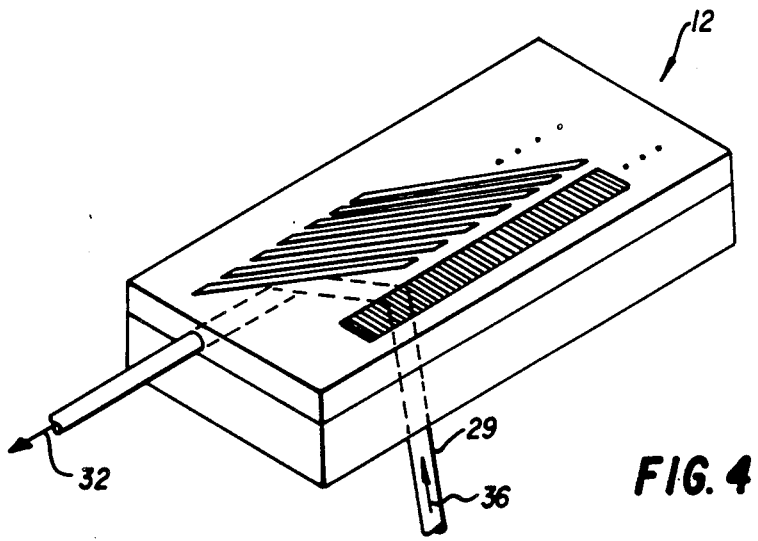
FIG. 4 is a partial perspective view of the scanner, illustrating the operation of the scanner in an input mode.

With reference to FIG. 4, there is shown an illustration of the operation of the present invention in an input mode As shown in FIG. 4, a light beam 29, from a scanned surface (not shown) is directed in the direction of arrow 36 onto a section of deflector 12, and the electrodes 24 are sequentially actuated to deflect the light beam in the direction of arrow 32 to a photodetector (not shown). It will be apparent that the devices shown in FIGS. 1 and 4 could be used in combination for both the illumination of a receiving medium and the collection of light therefrom.

This invention has been described in detail with particular reference to a preferred embodiment thereof, but it will be understood that variations and modifications can be effected within the spirit and scope of the invention.

We claim:

1. A scanner comprising:
   a substrate formed of an optical material;
   a thin film optical waveguide on the surface of said substrate;
   a plurality of generally parallel electrodes formed on said waveguide, said electrodes extending in a first direction and being generally parallel to each other;

means for applying a voltage to said electrodes to produce a spatial variation in the index of refraction of the waveguide across the thickness thereof;

means for coupling a coherent light beam into said waveguide in a second direction transverse to said first direction, said beam forming an angle with said electrodes which is less than the maximum angle which will produce total internal reflection in said waveguide, said beam propagating in said second direction and being deflected into the plane of said waveguide upon encountering a spatial variation in the index of refraction; and means for coupling the deflected beam out of said waveguide.

2. A scanner, as defined in claim 1, wherein said means for coupling the deflected beam is a Bragg-matched grating formed in said waveguide.

3. A scanner, as defined in claim 1, wherein optical elements are provided for imaging said deflected beam onto a recording medium.

4. A scanner, as defined in claim 3, wherein said means for applying a voltage includes means for applying a voltage to successive ones of said electrodes to move said deflected beam across the recording medium.

5. A scanner, as defined in claim 4, wherein said voltage is applied across adjacent electrodes.

6. A scanner, as defined in claim 4, wherein said voltage si applied across said electrodes and said substrate.

7. A scanner, as defined in claim 1, wherein said waveguide is formed from $LiNbO_3$.

8. A scanner, as defined in claim 1, wherein said waveguide is formed from $BaTiO_3$.

9. A scanner for scanning a light beam across a receiving medium comprising:

an optically-transmissive electro-optic element having a predetermined optical axis;

a plurality of individually addressable electrodes coupled to said electro-optic element, said electrodes being generally parallel and being equally spaced along said axis;

means for applying a voltage to a selected one of said electrodes to produce a spatial variation in the index of refraction of said element across a thickness thereof;

means for supplying a coherent beam of light to said element along said axis, said beam of light being deflected upon encountering a spatial variation in the index of refraction;

means for coupling the deflected beam out of said element; and means for applying said voltage to successive ones of said electrodes to move said deflected beam across said receiving medium.

* * * * *